Dec. 13, 1966 A. SOBCZAK 3,291,353
SERVICE TRAY FOR USE IN AUTOMOBILES AND THE LIKE
Filed Oct. 24, 1965 2 Sheets-Sheet 1
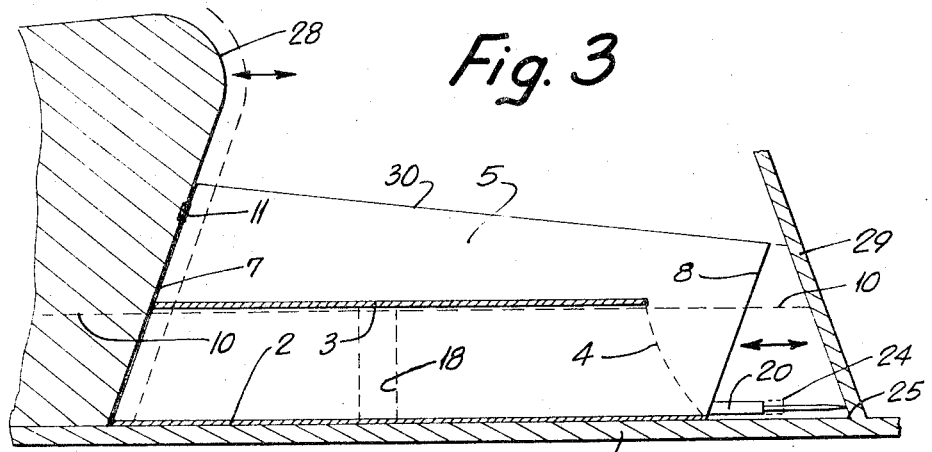
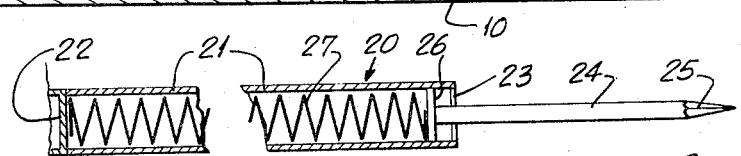
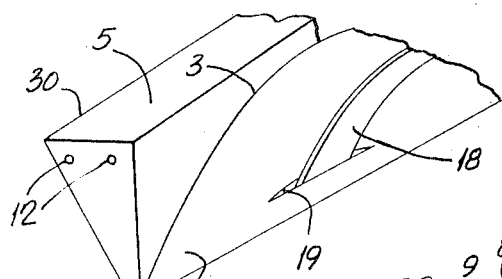
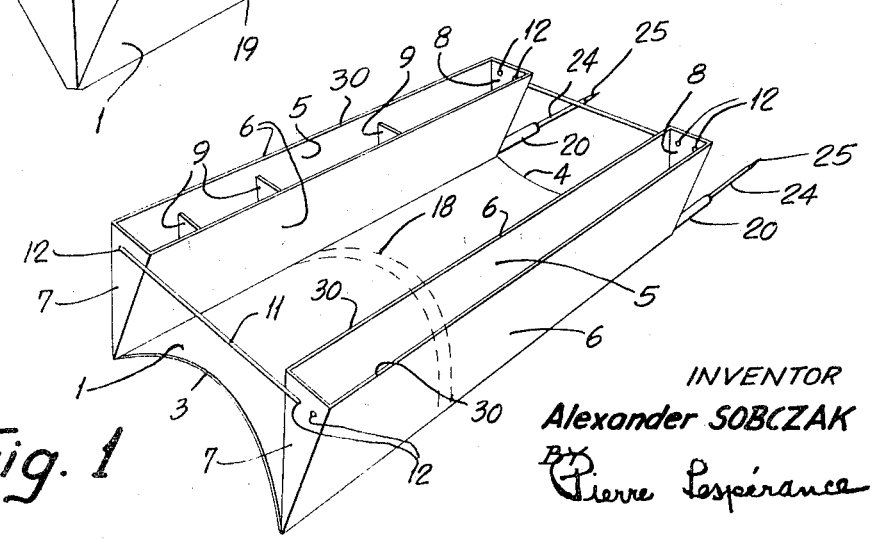
INVENTOR
Alexander SOBCZAK
BY
Pierre Lespérance
PATENT AGENT Dec. 13, 1966     A. SOBCZAK     3,291,353
SERVICE TRAY FOR USE IN AUTOMOBILES AND THE LIKE
Filed Oct. 24, 1965                         2 Sheets-Sheet 2
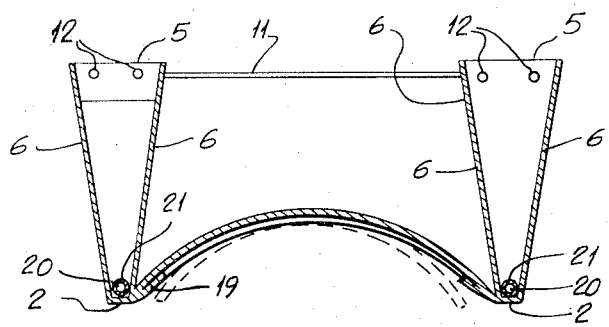
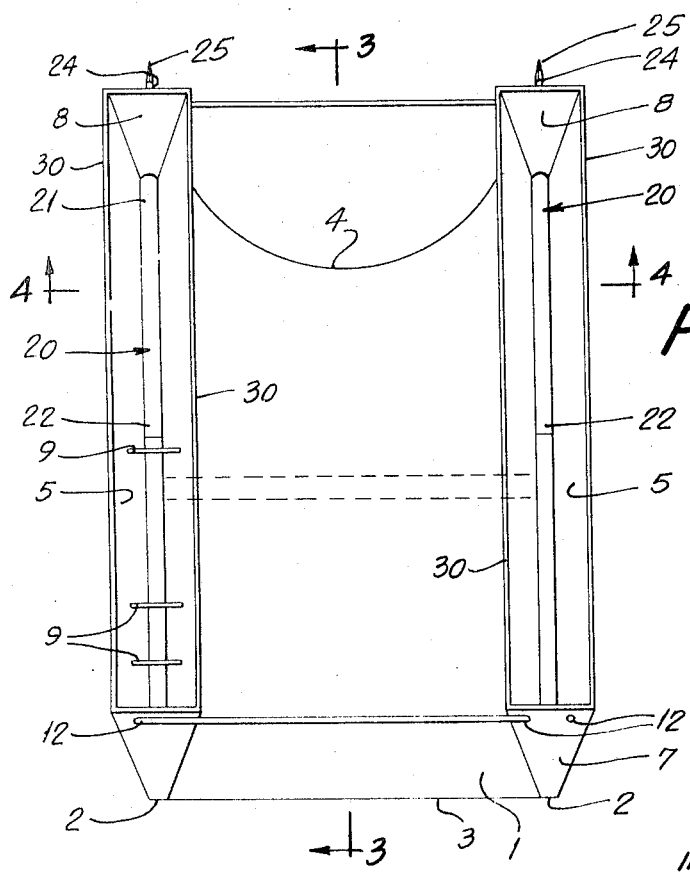
INVENTOR
Alexander SOBCZAK
BY Pierre L'espérance
PATENT AGENT

United States Patent Office 3,291,353
Patented Dec. 13, 1966

3,291,353
SERVICE TRAY FOR USE IN AUTOMOBILES
AND THE LIKE
Alexander Sobczak, 4690 Victoria Ave., Montreal,
Quebec, Canada
Filed Oct. 24, 1965, Ser. No. 504,391
7 Claims. (Cl. 224—42.42)

The present invention relates to service trays adapted for use in automobiles and in other relations and which is adapted to be fitted on a convex surface, such as the shaft hump of an automobile.

The main object of the present invention is to provide a tray arranged to be mounted on the shaft hump of an automobile between the fire wall and the front seat in stable position, and which will remain in place while allowing adjustment of the longitudinal position of the front seat without removing the tray.

Another object of the present invention resides in a service tray suitable particularly for salesmen, executives, travellers, school-teachers, etc., which can be fitted to any kind of complex transverse curvature of the shaft hump and which may hold a relatively large number of different items in easily accessible position, such as catalogues, index cards, folders, maps, books, note-books, cameras, radios, tissue boxes and other movable articles to prevent breakage.

Another object of the present invention resides in the provision of a tray of the character described, in which the compartments for storing different small items are shaped in such a way that the items will not be pulled out of the tray under air suction when the automobile windows are open, and the tray will not become jolted out of its position by abrupt jolting of the car due to sudden stops and sharp turns.

The foregoing and other important objects of the present invention will become more apparent during the following disclosure and by referring to the drawings, in which:

FIGURE 1 is a perspective view of the service tray in accordance with the invention;

FIGURE 2 is a top plan view of the service tray;

FIGURE 3 is a longitudinal section, taken on line 3—3 of FIGURE 2, showing the tray in position on an automobile shaft hump between the fire wall and the front seat, said fire wall, shaft hump and front seat being shown schematically and in cross-section;

FIGURE 4 is a cross-section, taken along line 4—4 of FIGURE 2;

FIGURE 5 is a partial perspective view, on an enlarged scale; and

FIGURE 6 is a longitudinal section of a prong assembly.

Referring now more particularly to the drawings in which like reference characters indicate like elements throughout, the service tray in accordance with the invention consists essentially of a flexible bottom wall adapted to fit over the transverse contour of an automobile shaft hump and the like convex surfaces; of elongated compartments upstanding from and secured to the opposite longitudinal edge portions of the bottom wall; of means to hold the compartments in upstanding position; and of spring-loaded prongs protruding from an end of the tray compartment adaptable to abut against the fire wall, or the like surface upstanding at the opposite end of the tray.

A flexible bottom wall 1 is preferably made of plastic material, or light metal, and is generally of rectangular shape with substantially parallel longitudinal marginal portions 2, a front transverse edge 3, which is preferably straight, and a rear edge 4, which is concave to form a recess in the bottom wall, as shown in FIGURE 2.

A pair of compartments 5, of rigid construction, are secured on top of the longitudinal marginal portions 2 of bottom wall 1. Each compartment 5 has preferably a V-shaped cross-section with upwardly flaring longitudinal walls 6, the compartments each having a rear wall 7 and a front wall 8, of triangular flat shape, the compartments being open at the top.

Preferably, removable partitions 9 are adjustably inserted within the compartments 5 and are disposed longitudinally of the same to form sub-compartments of any desired length.

The compartments 5 are arranged substantially parallel to each other and extend longitudinally of the automobile shaft hump 10, as shown in FIGURE 3.

With the bottom wall 1 draped over hump 10 such that the bottoms of the compartments 5 are at a lower level than the longitudinal crest of hump 10, the compartments 5 are maintained in upstanding position by means of semi-rigid wires, or bars 11, engaging one or the other of holes 12 made at the back and front walls 7 and 8 of the two compartments near the top of said back and front walls. The wires 11 prevent the compartments 5 from moving outwardly and also inwardly. Wires 11 may be adjustably mounted in any one of the holes 12, in accordance with the amount of storage space which it is desired to provide between the two compartments and over bottom wall 1.

A flat steel spring bar 18 is preferably disposed underneath bottom wall 1, and its ends are inserted in pockets 19 made in said bottom wall 1, which said steel spring bar adjusts and securely holds bottom wall 1 to the various shapes of automobile shaft hump 10, permitting adjustment of driver's seat without removal of tray, as shown in FIGURE 5.

The service tray is further provided with extensible prong assemblies 20 protruding from the front end of the tray. More particularly, each prong assembly 20 consists of a tube 21 secured to and extending longitudinally of the bottom of each compartment 5 and protruding through the front wall 8 of said compartments.

Tube 21 is closed at its rear end at 22, while its front end wall 23 is provided with central opening for the passage of a long stem 24 having a pointed tip 25. The stem 24 has a head 26 disposed inside tube 21 and against which abuts a compression spring 27, the other end of which abuts against rear closure 22 of tube 21.

With the service tray in position longitudinally of the shaft hump 10, the tips 25 of the stems 24 engage under the action of compression springs 27 the fire wall 29 of an automobile, whereby the rear walls 7 of the compartments 5 will be urged into engagement with the front surface of the front automobile seat 28.

The compression springs 27 allow sufficient longitudinal movement of the stem 24 to take care of any longitudinal displacement of the front seat, while adjusting the position thereof to suit the automobile driver.

However, one or the other of spring steel 18, as shown on FIGURE 5, disposed under wall 1, and prong assemblies 20, as shown on FIGURE 6, protruding from front end of compartments 5, can be used with satisfactory results.

The rear walls 7 of compartments 5 are preferably upwardly and rearwardly inclined to fit most front seats 28 of automobiles, while the front walls 8 of compartments 5 are also upwardly and rearwardly inclined to increase the length of the compartments 5.

The top edges 30 of the compartments 5 are preferably frontwardly downwardly inclined to provide compartments of varying depths from one end to another.

Small items may be stored in the compartments 5 or into any one of the sub-compartments provided by partitions 9, while larger items may be stored directly on bottom wall 1 between the two compartments 5. The service tray is more or less wedged between the automobile fire wall and front seat by means of the telescopic prongs 20 and also has a low center of gravity, because, in practice, the bottom portions of compartments 5 are well below the longitudinal crest of the shaft hump 10. Therefore, the service tray will be very stable and will not be displaced despite sudden jolting of the automobile.

The feature of the V shaped bottom of compartments 5 is to securely hold in place at the bottom single and light items, as well as prevent papers from flying out due to air currents.

Due to the flexibility of bottom wall 1, the service tray in accordance with the invention may be fitted over various shapes of shaft humps to suit practically any make of automobile.

While a preferred embodiment in accordance with the invention has been illustrated and described, it is understood that various modifications may be resorted to without departing from the scope of the appended claims.

What I claim is:

1. A service tray for use in automobiles and in other relations, comprising a flexible bottom wall adapted to be fitted over a convex surface with added steel spring bar for secure fitting, such as an automobile shaft hump, elongated compartments upstanding from and secured to opposite marginal portions of said bottom wall and adapted to extend longitudinally of said convex surface, means to hold said compartments in upstanding position and spring-loaded prongs protruding from an end of said tray to abut against an automobile fire wall and the like abutment surface upstanding from said convex surface, and engaging said tray securely against driver's seat, permitting at the same time free seat adjustment means.

2. A service tray as claimed in claim 1, wherein said spring-loaded prongs each comprises a tube rigid with a compartment and disposed longitudinally of the bottom wall, a compression spring in said tube and a pointed rod-like member telescopically engaged in said tube against the action of said compression spring.

3. A service tray as claimed in claim 1, wherein said compartments each has a substantially V-shaped cross-section with its longitudinal walls flaring upwardly.

4. A service tray as claimed in claim 3, further including partition members removably and adjustably inserted across said compartments.

5. A service tray as claimed in claim 1, wherein said holding means consist of elongated tension elements adjustably interconnecting the top portions of said compartments.

6. A service tray as claimed in claim 2, wherein said compartments each has side walls with a bottom edge, a top edge converging towards said bottom edge in the direction of said prongs, and end walls inclined upwardly and in the direction of said prongs.

7. A service tray as claimed in claim 1, wherein said secure fitting means consist of steel spring bar inserted in pockets on bottom wall.

References Cited by the Examiner

UNITED STATES PATENTS

| | | |
|---|---|---|
| 2,979,098 | 4/1961 | Greaves. |
| 3,002,665 | 10/1961 | Allen _____ 224—42.42 |
| 3,163,287 | 12/1964 | Barnett _____ 224—42.42 X |

GERALD M. FORLENZA, *Primary Examiner.*

F. WERNER, *Assistant Examiner.*